(12) United States Patent
Thomas

(10) Patent No.: US 10,642,491 B2
(45) Date of Patent: May 5, 2020

(54) DYNAMIC SELECTION OF STORAGE TIERS

(71) Applicant: Amazon Technologies, Inc., Seattle, WA (US)

(72) Inventor: Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/277,588

(22) Filed: Sep. 27, 2016

(65) Prior Publication Data

US 2018/0314429 A1    Nov. 1, 2018

Related U.S. Application Data

(63) Continuation of application No. 13/675,718, filed on Nov. 13, 2012, now Pat. No. 9,460,099.

(51) Int. Cl.
*G06F 3/06* (2006.01)
*G06F 16/16* (2019.01)
*H04L 29/08* (2006.01)

(52) U.S. Cl.
CPC ............ *G06F 3/0605* (2013.01); *G06F 3/067* (2013.01); *G06F 3/0631* (2013.01);
(Continued)

(58) Field of Classification Search
CPC .... G06F 3/0685; G06F 3/0605; G06F 3/0631; G06F 3/0667; G06F 17/30115;
(Continued)

(56) References Cited

U.S. PATENT DOCUMENTS 6,839,815 B2 *   1/2005   Kagami ................ G06F 3/0605
                                                   707/999.202
7,849,274 B2    12/2010   Pittman
(Continued)

FOREIGN PATENT DOCUMENTS

CN          101911074 A      12/2010
JP          2002073383        3/2002
(Continued)

OTHER PUBLICATIONS

The Chinese Office Action dated Nov. 18, 2016 for Chinese patent application No. 201380058985.7, a counterpart foreign application of U.S. Pat. No. 9,460,099, 25 pages.
(Continued)

*Primary Examiner* — Hashem Farrokh
(74) *Attorney, Agent, or Firm* — Lee & Hayes, P.C.

(57) ABSTRACT

An operating system is configured to receive a request to store an object that does not specify the location at which the object should be stored. The request might also include an optimization factor and one or more object location factors. The operating system might also generate object location factors or retrieve object location factors from one or more external locations. Object location factors might also be utilized that are based upon properties of the object to be stored. Utilizing the object location factors, and the optimization factor if provided, the operating system dynamically selects an appropriate storage tier for storing the object. The tiers might include a local storage tier, a local network storage tier, a remote network storage tier, and other types of storage tiers. The object is then stored on the selected storage tier. The object may be retrieved from the storage tier at a later time.

20 Claims, 8 Drawing Sheets

(52) U.S. Cl.
CPC .......... *G06F 3/0644* (2013.01); *G06F 3/0659* (2013.01); *G06F 3/0664* (2013.01); *G06F 3/0667* (2013.01); *G06F 3/0685* (2013.01); *G06F 16/16* (2019.01); *H04L 67/1097* (2013.01)

(58) Field of Classification Search
CPC .. G06F 17/30386; G06F 3/067; G06F 3/0664; G06F 3/0659; G06F 16/16; G06F 3/0644; H04L 67/1097
USPC ........................................................ 711/117
See application file for complete search history.

(56) References Cited

U.S. PATENT DOCUMENTS

| | | | |
|---|---|---|---|
| 8,001,327 | B2 | 8/2011 | Mimatsu |
| 8,230,192 | B2 | 7/2012 | Balasubramanian et al. |
| 2003/0191799 | A1* | 10/2003 | Araujo ................ H04L 63/0272 709/203 |
| 2007/0185925 | A1 | 8/2007 | Prahlad et al. |
| 2008/0071726 | A1 | 3/2008 | Nair et al. |
| 2008/0126404 | A1 | 5/2008 | Slik et al. |
| 2008/0140944 | A1* | 6/2008 | Arakawa ............. G06F 11/1456 711/148 |
| 2009/0100224 | A1* | 4/2009 | Wang .................. G06F 12/0804 711/118 |
| 2009/0300079 | A1 | 12/2009 | Shitomi |
| 2010/0070725 | A1* | 3/2010 | Prahlad ............... G06F 11/1453 711/162 |
| 2011/0161327 | A1* | 6/2011 | Pawar .................. G06F 16/907 707/741 |
| 2012/0066337 | A1* | 3/2012 | Wu ....................... G06F 3/0605 709/214 |
| 2012/0203999 | A1 | 8/2012 | Jess |
| 2012/0260040 | A1 | 10/2012 | Mallge et al. |
| 2014/0136782 | A1 | 5/2014 | Thomas |

FOREIGN PATENT DOCUMENTS

| | | |
|---|---|---|
| JP | 2011513805 A | 4/2011 |
| RU | 2417420 | 4/2011 |
| WO | WO2009/089426 A1 | 7/2009 |
| WO | WO2012127988 | 9/2012 |

OTHER PUBLICATIONS

Translated Japanese Office Action dated Oct. 25, 2016 for Japanese Patent Application No. 2015-542011, a counterpart foreign application of U.S. Pat. No. 9,460,099, 5 pages.
The First Examination Report dated Jan. 29, 2016 for Australian patent application No. 2013345015, a counterpart foreign application of U.S. Appl. No. 13/675,718, 3 pages.
The Australian Office Action dated Apr. 5, 2016 for Australian patent application No. 2013345015, a counterpart foreign application of U.S. Appl. No. 13/675,718, 3 pages.
The Canadian Office Action dated Jun. 20, 2016 for Canadian Patent Application No. 2890720, a counterpart foreign application of U.S. Appl. No. 13/675,718, 3 pages.
The Extended European Search Report dated Jun. 20, 2016 for European Patent Application No. 13855505.7, 9 pages.
PCT International Search Report for Applcation No. PCT/US2013/069669, filed Nov. 12, 2013.
Translated Japanese Office Action dated May 24, 2016 for Japanese Patent Application No. 2015-542011, a counterpart foreign application of U.S. Appl. No. 13/675,718, 6 pages.
Final Office Action for U.S. Appl. No. 13/675,718, dated Jan. 9, 2015, Nathan Bartholomew Thomas, "Dynamic Selection of Storage Tiers", 20 pages.
Office action for U.S. Appl. No. 13/675,718, dated Nov. 27, 2015, Thomas, "Dynamic Selection of Storage Tiers", 19 pages.
Final Office Action for U.S. Appl. No. 13/675,718, dated Jun. 3, 2015, Nathan Bartholomew Thomas, "Dynamic Selection of Storage Tiers", 22 pages.
Office action for U.S. Appl. No. 13/675,718, dated Aug. 4, 2014, Thomas, "Dynamic Selection of Storage Tiers", 12 pages.
Translated Russian office action dated May 24, 2016 for Russian patent application No. 2015120595, a counerpart foreign application of U.S. Appl. No. 13/675,718, 10 pages.
"S3fs Fuse-Based file system backed by Amazon S3" [online][retrieved on Oct. 7, 2012], 41 pages, retrieved from: http://code.google.com/p/s3fs/wiki/FuseOverAmazon , 2 pps.
The Singapore Office Action dated Jun. 17, 2016 for Singapore Patent Application No. 11201503604S, a counterpart foreign application of U.S. Appl. No. 13/675,718, 5 pages.
Translation and the Chinese Office Action dated Jul. 25, 2017 for Chinese patent application No. 201380058985.7, a counterpart foreign application of U.S. Pat. No. 9,460,099, 24 pages.
Office Action issued by the Canadian Patent Office dated Mar. 13, 2017 for corresponding Patent Application No. 2890720, 3 pages.
The Singapore Office Action dated Apr. 7, 2017 for Singapore application No. 11201503604S, a counterpart foreign application of U.S. Pat. No. 9,460,099, 5 pages.
Translated Japanese Office Action dated Feb. 20, 2018 for Japanese Patent Application No. 2017-027164, a counterpart foreign application of U.S. Pat. No. 9,460,099, 7 pages.
The European Office Action dated Feb. 19, 2019 for European Patent Application No. 13855505.7, a counterpart of U.S. Pat. No. 9,460,099, 6 pages.
The European Summons to Attend Oral Proceedings mailed on Jul. 10, 2019 for European Patent Application No. 13855505.7, a counterpart of U.S. Pat. No. 9,460,099, 9 pages.
The Indian Office Action dated Nov. 11, 2019 for Indian Patent Application No. 3793/DELNP/2015, a counterpart of U.S. Pat. No. 9,460,099, 8 pages.

* cited by examiner

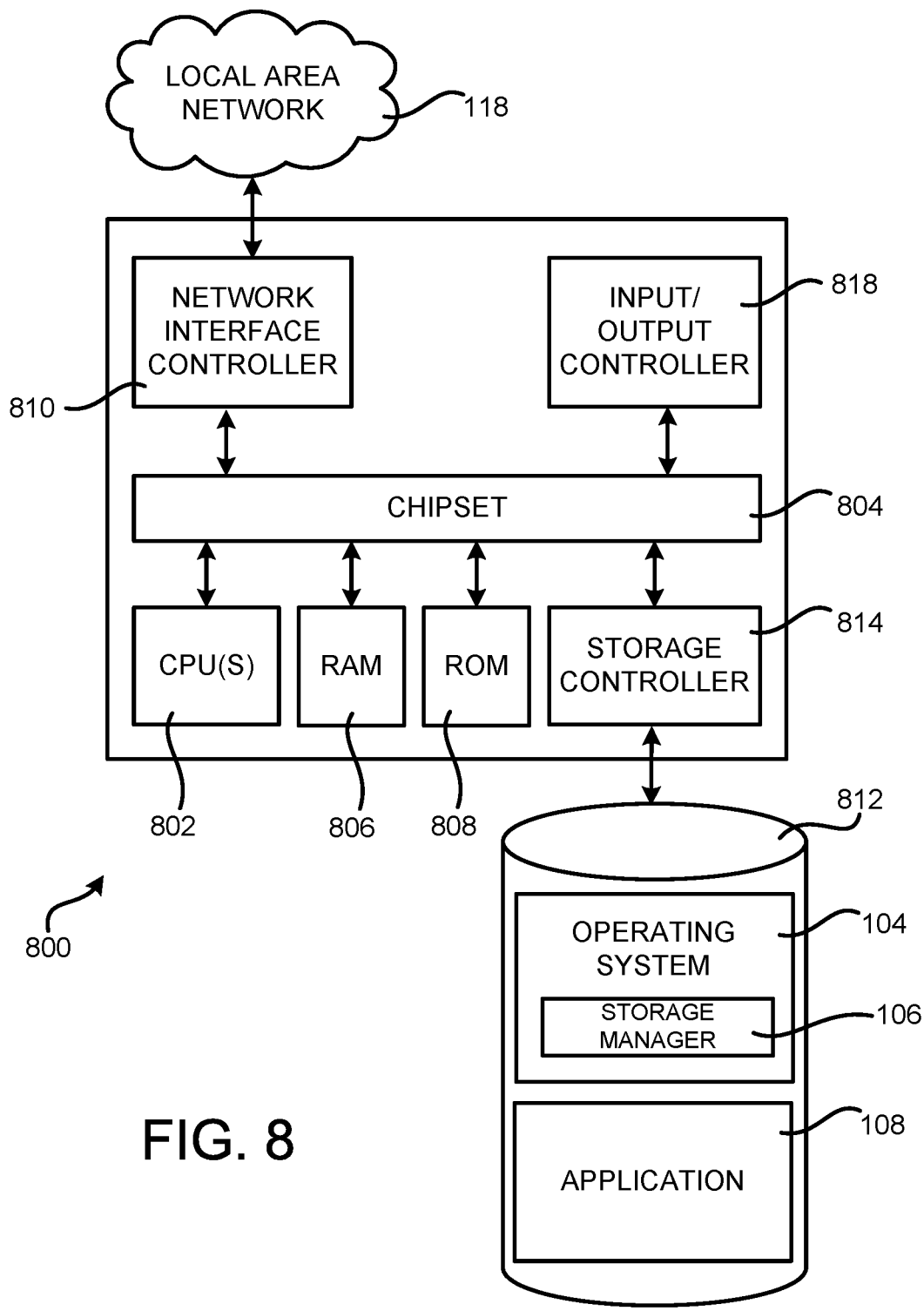

DYNAMIC SELECTION OF STORAGE TIERS

CROSS REFERENCE TO RELATED APPLICATIONS

This application is a continuation of U.S. patent application Ser. No. 13/675,718 filed Nov. 13, 2012 entitled "Dynamic Selection of Storage Tiers," which is incorporated herein by reference in its entirety.

BACKGROUND

A software developer may need to make many decisions about where to store data utilized by a program. Once the developer has made these decisions, the developer explicitly specifies where the data used by a program is to be stored. For example, a developer might utilize a particular programming function to store program data in random access memory ("RAM"). A developer might similarly utilize a different programming function in order to store data in a different location, such as on a network server. As a result, it is often necessary for developers to be aware of all of the potential locations for storing data and, additionally, to understand the frequently complex mechanisms for storing data in the various types of available locations. Moreover, a programmer might not always select the most appropriate location for storing data and, as a result, application performance might be negatively impacted.

The disclosure presented herein is made with respect to these and other considerations.

BRIEF DESCRIPTION OF THE DRAWINGS

FIG. 8 is a computer architecture diagram showing one illustrative computer hardware architecture for implementing a computing device that might be utilized to implement aspects of the various embodiments presented herein.

DETAILED DESCRIPTION

Figure 1:
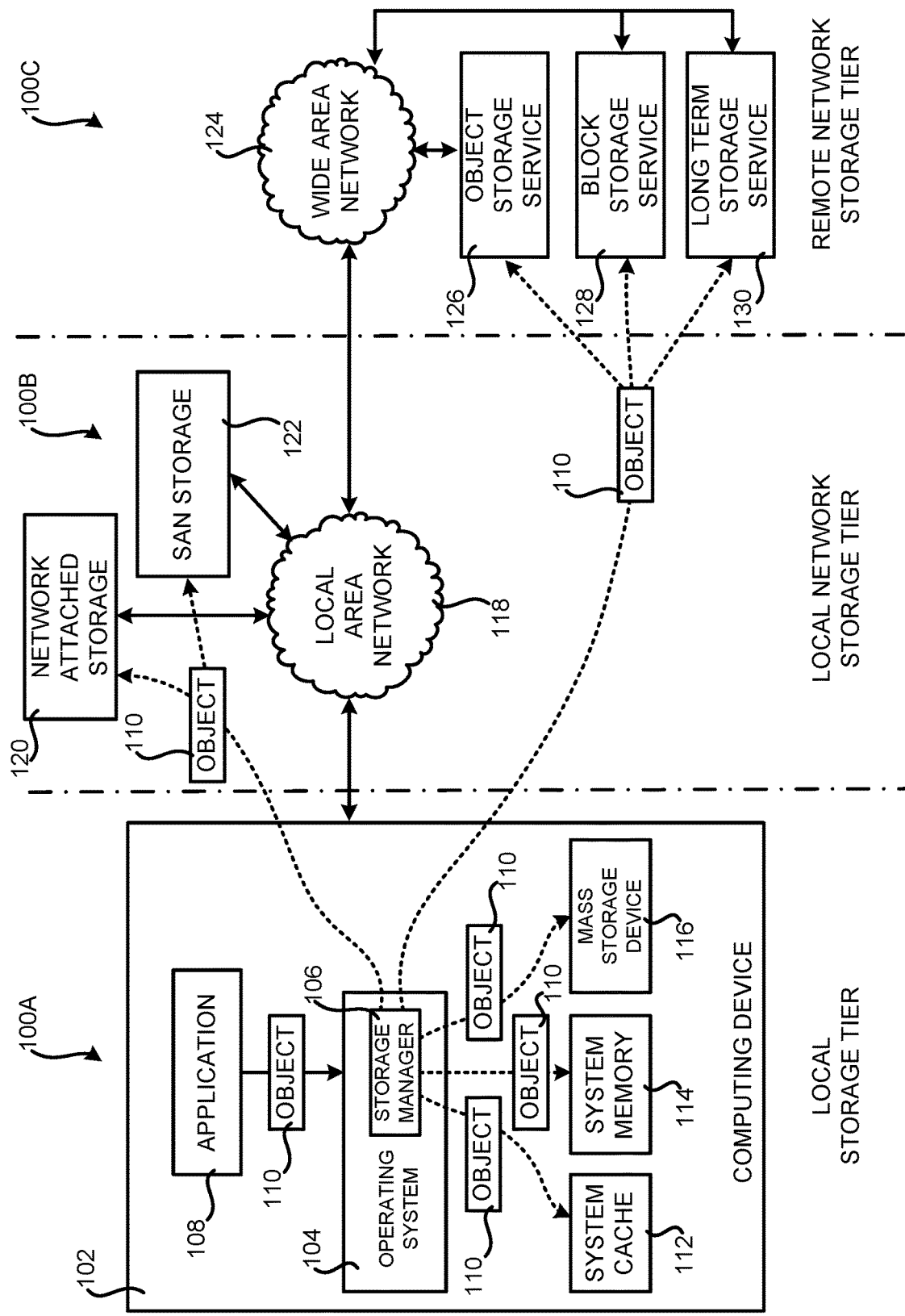
FIG. 1 is a network and system diagram showing aspects of one illustrative mechanism disclosed herein for dynamic selection of storage tiers.

The following detailed description is directed to technologies for dynamic selection of storage tiers. Utilizing the technologies described herein, an operating system can dynamically select an appropriate storage tier for storing an object based upon one or more object location factors. The object location factors may include factors such as the cost of storing data at each tier, the bandwidth or latency associated with each storage tier, the type of data being stored, and/or other considerations. By utilizing object location factors to dynamically select an appropriate storage tier for storing objects, a developer can be freed from making the decisions regarding where objects are to be stored and from the complex mechanisms utilized to actually store data. Additional details regarding these and other aspects of the concepts and technologies disclosed herein for dynamic selection of storage tiers are provided below.

According to one aspect presented herein, an operating system is configured with a storage manager that provides functionality for dynamically selecting a storage tier for storing objects, both big and small. Other components within an operating system might also provide the functionality described herein as being performed by the storage manager. The objects might be data objects utilized in the execution of the operating system, application programs, or other types of processes. It is intended that the term "object" as utilized herein encompass the storage of any type of digital data utilized by any type of executable process.

In order to store an object, an application program may be configured to make an unqualified request to the storage manager to store an object. The term "unqualified" as utilized herein means that the request does not specify the location at which an object should be stored. The request may, however, include data defining an optimization factor and, potentially, one or more object location factors. As will be described in greater detail below, the storage manager may utilize the optimization factor and one or more of the object location factors provided with the request to dynamically select a storage tier for storing the object.

The storage manager may also be configured in embodiments to generate one or more object location factors that might also be utilized when selecting a storage tier for an object. For example, the storage manager might be configured to monitor the bandwidth and/or latency of a network or other type of connection to the storage tiers. The bandwidth and latency might be utilized as object location factors. As another example, the storage manager might also monitor the historical usage patterns of objects. The historical usage patterns for objects might also be utilized as object location factors. The storage manager, or another component operating in conjunction with the storage manager, might also perform other types of processing to generate other object location factors in other embodiments.

In some embodiments the storage manager also retrieves object location factors from one or more external sources. For example, the storage manager might retrieve data indicating the cost of storing data at one or more of the storage tiers, such as from a storage service accessible via a wide area network ("WAN"), such as the Internet. The storage manager might also retrieve other data from other sources that is utilized as object location factors. Object location factors might also be based upon properties of the object to be stored. For example, the object type, size, file attributes, security requirements, sharing requirements, and the compressibility of the object may be utilized as object location factors. Other properties of an object might also be utilized.

As discussed briefly above, the storage manager utilizes the object location factors to dynamically select a storage tier for an object. For instance, if an optimization factor is provided with a request to store an object that specifies that storage of the object is to be optimized based upon cost, the storage manager might select a storage tier having the lowest cost. If an optimization factor is provided that specifies that the storage of the object is to be optimized based upon speed of access, the storage manager might select a storage tier accessible by way of a connection having the highest available bandwidth and/or lowest latency. The storage manager might also utilize a combination of object location factors to select an appropriate location for storing an object. In other embodiments, a request to store an object made to the storage manager might not include an optimization factor. In these embodiments, the storage manager might select a suitable storage tier for the object based only upon the available object location factors. Other information might be also be utilized to dynamically select a storage tier in other embodiments.

In some embodiments, the available storage tiers include a local storage tier. The local storage tier includes the system caches, memory, and mass storage devices of the computer upon which the storage manager is executing. The storage tiers might also include a local network storage tier that includes one or more storage systems accessible by way of a local area network ("LAN"). The storage tiers might also include a remote network storage tier that includes one or more storage services accessible by way of a WAN, such as the Internet. In some embodiments, the storage manager also includes functionality for discovering available storage tiers. Additional details regarding the various components and processes described above for dynamic selection of a storage tier for storing an object will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network and system diagram showing aspects of one illustrative mechanism disclosed herein for dynamic selection of storage tiers. As shown in FIG. 1, a computing device 102 is disclosed in one embodiment presented herein that is configured to execute an operating system 104 configured with a storage manager 106. The computing device 102 might be a desktop or laptop computer, a server computer, a smartphone, tablet computer, or another type of stationary or mobile computing device. The operating system 104 might be executing directly on the hardware of the computing device 102 or within a virtual machine environment.

As will be described in greater detail below, the storage manager 106 is configured to receive requests from the operating system 104, or from an application 108 executing on a computing device 102, to store an object 110. As discussed above, an object 110 may be a data object utilized in the execution of the operating system 104, the application 108, or other types of processes executing on the computing device 102. The term "object" as utilized herein encompasses the storage of any type of digital data utilized by any type of executable process.

As also discussed briefly above, the request to store the object 110 is "unqualified" in one embodiment. An unqualified request is a request that does not specify the location at which an object should be stored. In previous systems, a developer of software typically had to specify whether an object (e.g., process specific data, a file, etc.) is to be stored in a RAM memory, on a network device, or in another location. Utilizing the embodiments presented herein, however, a single atomic mechanism can be exposed through which a developer can request storage of virtually any type of object 110, regardless of its size. Through this mechanism, the object 110 is stored in an appropriate storage tier based upon the type of object 110 and, potentially, multiple other object location factors. The storage manager 106 might interact with the memory management, block storage, and network layers of the operating system 104 to provide this functionality. Additional details regarding the various object location factors that might be utilized to select the storage tier for an object 110 will be described below with regard to FIG. 2.

In the example operating environment shown in FIG. 1, three storage tiers 100A-100C (which might be referred to singularly as a storage tier 100 or collectively as the storage tiers 100) are available for storing the object 110. The local storage tier 100A includes the system cache 112, the system memory 114, and one or more mass storage devices 116 present in the computing device 102 executing the operating system 104. The mass storage devices might be spinning disk media and/or solid state drives ("SSD") in various embodiments. The local storage tier 100A might also include other types of storage devices in other embodiments.

As also shown in FIG. 1, a local network storage tier 100B might also be utilized to store an object 110. The local network storage tier 110B includes one or more storage systems accessible to the computing device 102 by way of a LAN 118. For instance, in the illustrative operating environment shown in FIG. 1, a network attached storage device 120 and a storage area network device 122 are available. Other types of storage systems might also be made available via a LAN 118.

In the embodiment illustrated in FIG. 1, a remote network storage tier 100C is also available. The remote network storage tier 100C includes one or more storage services that are available via a WAN, such as the Internet. In the example shown in FIG. 1, for instance, an object storage service 126, a block storage service 128, and a long term storage service 130 are available for storing an object 110. Other types of services might also be made available by way of a remote network storage tier 100C in other embodiments.

In the example shown in FIG. 1, three storage tiers 100A-100C are illustrated. It should be appreciated, however, that a different number of storage tiers 100 might be utilized in other embodiments. Additionally, it should be appreciated that each of the storage tiers 100A-100C may be defined by unique operational characteristics. For example, the local storage tier 100A may be characterized by fast, but limited capacity storage. Similarly, the local network storage tier 100B might be characterized by slightly slower access times than the local storage tier 100A, but greater storage capacity. Similarly, the remote network storage tier 100C might be characterized by even greater access times, but significantly larger storage and greater reliability, and potentially lower cost than the local network storage tier 100B. As will be described in greater detail below, some or all of the characteristics of the storage tiers 100A-100C might be utilized to select an appropriate storage tier 100 for storing an object 110.

In the example shown in FIG. 1, an application 108 has transmitted a request to the storage manager 106 to store an object 110. As discussed above, the request to the storage manager 106 may be unqualified. In some embodiments, the request might also specify an optimization factor and one or more object location factors. The optimization factor is data identifying an attribute upon which selection of an appropriate storage tier 100 for the object 110 should be optimized. For instance, the optimization factor might specify that the selection of an appropriate storage tier be optimized to minimize cost. Similarly, the optimization factor might specify that selection of an appropriate storage tier 100 be optimized to maximize the available access speed to the object 110. Other types of factors might also be specified. Additional details regarding the optimization factor specified with a request to store an object 110 will be provided below with respect to FIG. 2.

As mentioned briefly above, a request to store an object 110 might also include one or more object location factors. The object location factors are factors utilized by the storage manager 106 when selecting an appropriate storage tier 100 for an object 110. As will be described in greater detail below with regard to FIG. 2, the object location factors might be based upon properties of the object 110, computed by the storage manager 106, retrieved from a location external to the computing device 102, provided with a request to store an object 110, or generated and/or obtained in other ways.

In response to receiving a request to store an object 110, the storage manager 106 selects an appropriate storage tier 100 for the object 110. As described herein, the storage manager 106 utilizes the object location factors to select an appropriate storage tier 100. Additionally, if an optimization factor is provided with the request to store the object 110, the storage manager 106 might also use the supplied optimization factor. Other data might also be utilized.

Several examples describing the manner in which the storage manager 106 might select an appropriate storage tier 100 for an object 110 will now be described. In one example, for instance, the storage manager 106 might determine that the object 110 is relatively small and that quick and frequent access to the object 110 is desirable. In this example, the storage manager 106 might store the object 110 in the system cache 112. In another example, the storage manager 106 might determine that the object 110 is larger than the maximum capacity of the system cache 112, but that immediate and frequent access to the object 110 is desirable. In this example, the storage manager 106 might store the object 110 in the system memory 114. If the storage manager 106 determines that the object 110 is too large to store in the system memory 114, the storage manager 106 might store all or a portion of the object 110 on the mass storage device 116.

If the storage manager 106 determines that near immediate access to an object 110 is not required, the storage manager 106 might select the local network storage tier 100B for storing the object 110. Similarly, if the object 110 is to be accessed very infrequently, the storage manager 106 might select the network storage tier 106 due to its low cost and high reliability. Additional details regarding these, and other processes and factors, utilized by the storage manager 106 in selecting an appropriate storage tier 100 for storing an object 110 will be provided below with regard to FIG. 2.

Once the storage manager 106 identifies an appropriate storage tier 100 for an object 110, the storage manager 106 will cause the object 110 to be stored at the selected storage tier 100. Subsequently, the storage manager 106 may process requests to read the object 110 by retrieving the object 110 from the storage tier 100 at which it was previously stored. Once the object 100 has been retrieved from the storage tier 100 upon which it was previously stored, the object 110 may be provided to the process requesting to read the object 110. These and other aspects of the operation of the storage manager 106 will be described in greater detail below with regard to FIG. 2.

It should be appreciated that the illustrative operating environment shown in FIG. 1 is merely illustrative, and that many other types of operating environments might be utilized. For instance, the networks 118 and 124 illustrated in FIG. 1 have been simplified for discussion purposes. In this regard, it should be appreciated that many more networks, networking devices, computer systems, and software components might be utilized to implement the embodiments disclosed herein than illustrated in FIG. 1. Additionally, although the storage manager 106 has been described as providing the functionality disclosed herein for dynamically selecting a storage tier 100, it should be appreciated that this functionality might be provided by the operating system 104 or another component. This functionality might also be provided by a combination of components executing locally or on distributed computing devices.

It should also be appreciated that, in one implementation, the computing device 102 might be collocated with computer systems that provide the various services of the remote network storage tier 100C. Thus, in an embodiment local storage tier 100A, the local network storage tier 100B, and/or the remote network storage tier 100C may be physically located in the same data center. For example, in one implementation, the computing device 102 is a server computer, such as server computer 702A, configured as a part of a distributed execution environment that provides the remote network storage tier 100C. In this example, the operating system 104 can be executed in a virtual machine as an instance, such as instance 706A. A user might access and control the operating system 104 and the application 108 utilizing a client application configured with the remote desktop protocol ("RDP") or another similar protocol. Objects generated by the customer in this way might then be stored dynamically in an appropriate storage tier 100 utilizing the various technologies disclosed herein. Additional details regarding this particular embodiment will be provided below with respect to FIG. 6 and FIG. 7.

Figure 2:
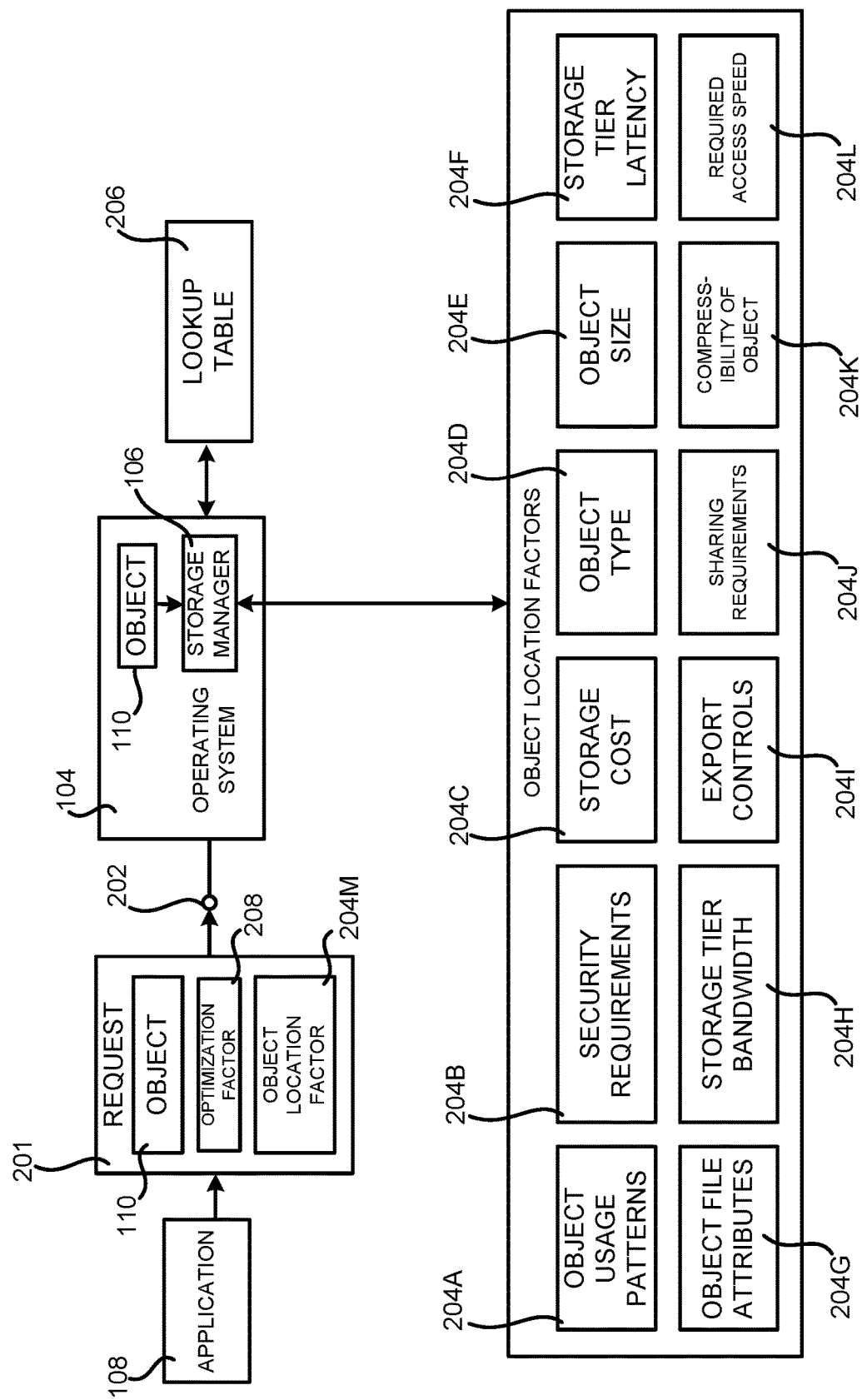
FIG. 2 is a system diagram showing additional aspects of one illustrative mechanism disclosed herein for dynamic selection of storage tiers.

FIG. 2 is a system diagram showing several additional aspects of one illustrative mechanism disclosed herein for dynamic selection of storage tiers 100. As shown in FIG. 2, and described briefly above, an application 108 may provide a request 201 to a storage manager 106 executing as part of an operating system 104. Other types of executing processes might also use the functionality disclosed herein as being provided by the storage manager 106. For instance, the operating system 104 might also utilize the functionality described herein to store an object 110. Other types of processes might also utilize the functionality disclosed herein for storing an object 110.

In some embodiments, the operating system 104 exposes an application programming interface ("API") 202 through which an application 108 can submit a request 201. In other embodiments, however, the operating system 104 might expose other mechanisms through which a process can request to store an object 110. For instance, a programming function might be exposed through a programming library that can be utilized by various programming languages for accessing the functionality disclosed herein. Other types of mechanisms might also be utilized to allow applications 108, operating systems 104, and other types of processes to utilize the functionality disclosed herein for dynamically selecting a storage tier 100 for storing an object 110.

As discussed briefly above with regard to FIG. 1, a request 201 might also include an optimization factor 208 and one or more object location factors 204. In the example shown in FIG. 2, for instance, the application 108 has provided an optimization factor 208 and an object location factor 204M to an API 202 exposed by the operating system 104 for requesting storage of an object 110. In this regard, it should be appreciated that a request 201 need not include an optimization factor to 208 or an object location factor 204. In the event that a request 201 is received that does not include an optimization factor 208 or an object location factor 204, the storage manager 106 will select an appropriate storage tier 100 for the object 110 based upon object location factors computed by the storage manager 106 or obtained from other locations. Additional details regarding this process will be described below.

As also discussed briefly above, some of the object location factors 204 might be based upon properties of the object 110 to be stored. For instance, and as illustrated in FIG. 2, object file attributes 204G of the object 110 to be stored might be utilized as object location factors. The object file attributes 204G might include, for instance, information defining ownership of the object 110, information regarding processes authorized to read and write the object 110, and other information. Similarly, the object size 204E might also be utilized as an object location factor.

The object type 204D might also be utilized as an object location factor. The object type 204D might describe the type of data in the object 110. In this regard, the compressibility of the object 204K might also be utilized as an object location factor 204 when determining an appropriate storage tier 100 for the object 110. Other properties of an object 110 might also be utilized when determining an appropriate storage tier 100 for the object 110.

As discussed above, the storage manager 106, or another component, might also compute one or more of the object location factors 204. For example, in one implementation, the storage manager 106 or another component might compute the storage tier latency 204 and/or the storage tier bandwidth 204H to each of the available storage tiers 100.

The latency and bandwidth might be computed on an ongoing basis, so that the storage manager 106 has updated information regarding the availability of each storage tier 100 at the time a request 201 to store an object 110 is received.

The storage manager 106 might also be configured to retrieve object location factors 204 from an external service. For example, in one implementation, the storage manager 106 is configured to retrieve a storage cost 204C from a storage service available by way of the remote network storage tier 100C. The storage manager 106 might also retrieve other types of information from other types of external services that may be utilized as an object location factor 204. As another example, a storage service might maintain historical data regarding the usage patterns for a particular object 110. The storage manager 106 may retrieve the object usage patterns 204A when determining an appropriate storage tier 100 for the object 110.

It should be appreciated that, in other embodiments, other types of object location factors might be received with a request 201, computed by the storage manager 106, retrieved from an external service, or obtained in other ways. In the example shown in FIG. 2, the object location factors 204 also include security requirements 204B associated with the object 110, sharing requirements 204J associated with the object 110, a required access speed 204L to the object 110, and the availability of each storage tier. These object location factors might be supplied with a request 201 or obtained by the storage manager 106 in another manner. It should be appreciated that the object location factors 204 shown in FIG. 2 are merely illustrative and that the storage manager 106 might utilize many other types of factors when selecting an appropriate storage tier 100 for storing an object 110.

It should also be appreciated that the format of the request 201 shown in FIG. 2 is illustrative and that the request 201 might include other data not shown in FIG. 2. For example, in another implementation, the request 201 might include a "hint" or suggestion as to where the object 110 should be stored. The storage manager 106 might utilize the hint to select an appropriate tier 100 for storing the object 110 or might ignore the hint provided by the application 108. Other types of data might also be included in the request 201 for use by the storage manager 106 in selecting a storage tier 100.

Once the storage manager 106 has selected an appropriate storage tier 100 for an object 110, the storage manager 106 causes the object 110 to be stored at the selected storage tier 100. Additionally, the storage manager 106 might create an entry in a lookup table 206 that provides an indication that the object 110 was stored at a particular storage tier 100. As will be described in greater detail below, the contents of the lookup table 206 might be utilized to identify a storage tier 100 at which an object 110 was stored in response to receiving a request to read the object 110. Additional details regarding these and other aspects of the operation of the storage manager 106 will be provided below with respect to FIGS. 3-5.

Figure 3:
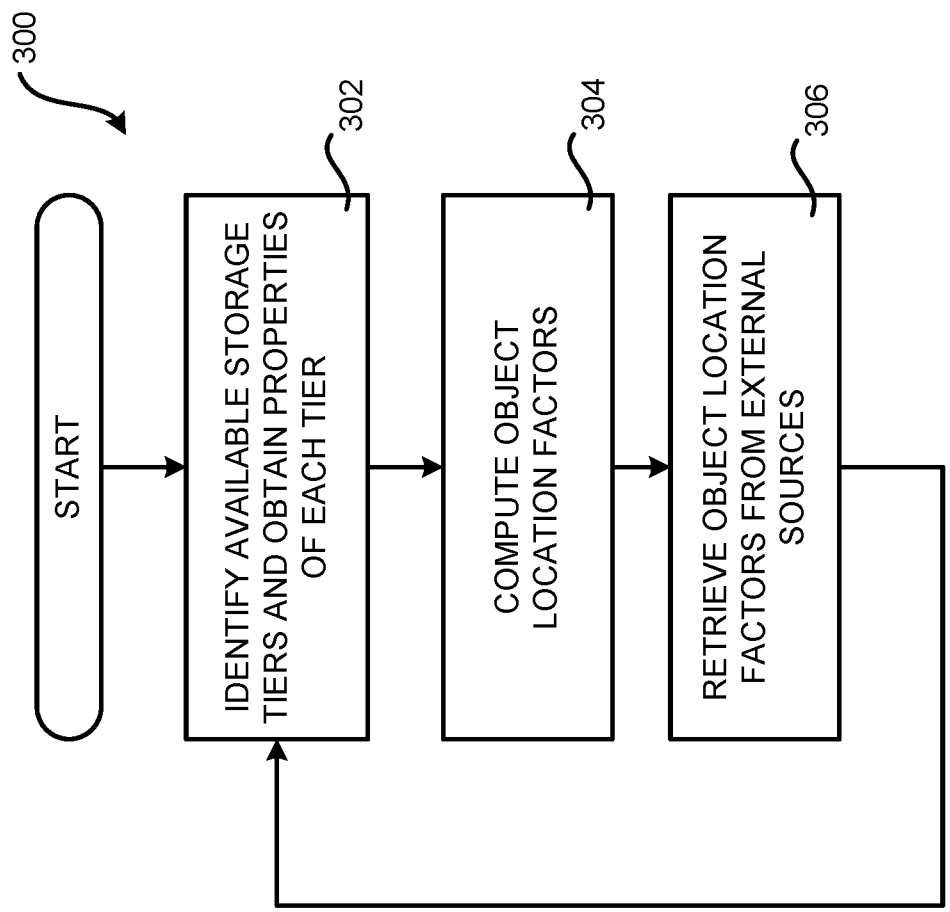
FIG. 3 is a flow diagram showing one illustrative routine that describes aspects of a mechanism disclosed herein for identifying available storage tiers and for computing or otherwise obtaining one or more object location factors, according to one embodiment disclosed herein.

FIG. 3 is a flow diagram showing one illustrative routine 300 that describes aspects of one mechanism disclosed herein for identifying available storage tiers 100, and for computing or otherwise obtaining one or more object location factors 204, according to one embodiment disclosed herein. It should be appreciated that the logical operations described herein with respect to FIG. 3 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. Some operations might also be performed in parallel, or in a different order than those described herein.

The routine 300 begins at operation 302, where the storage manager 106 identifies the available storage tiers 100 and obtains the properties of each tier 100. For example, in some embodiments, the storage manager 106 includes functionality for identifying services available via a remote network storage tier 100C, such as the object storage service 126, the block storage service 128, and the long term storage service 130. Other mechanisms might also be utilized to discover and identify storage systems available on the local network storage tier 100B and storage devices available on the local storage tier 100A.

In this regard, the amount of available storage, storage limits, and other attributes of the available on the various storage tiers 100 might also be discovered by the storage manager 106 or another related component. Tuning and optimization settings might also be discovered for the storage services on each tier 100. Additionally, in some implementations, a user of the computing device 102 might be permitted to specify the available storage tiers 100, to provide credentials for each of the storage tiers 100, and/or to specify various properties of each of the tiers 100 such as those described above. Once the available storage tiers 100A-100C have been identified, the routine 300 proceeds from operation 302 to operation 304.

At operation 304, the storage manager 106, or another component, computes one or more of the object location factors 204. For example, and as discussed briefly above, the storage manager 106 might continually compute the storage tier latency 204F and the storage tier bandwidth 204H for each of the storage tiers 100 identified at operation 302. These computations may be performed on a regular and ongoing basis so that the storage manager 106 has fresh information regarding the latency and throughput to each tier 100. Other types of computations might also be performed to generate other types of object locations factors 204 in other embodiments.

From operation 304, the routine 300 proceeds to operation 306, where the storage manager 106 retrieves one or more object location factors 204 from one or more external sources. As discussed above, for example, the storage manager 106 might retrieve the storage costs 204C from services available by way of the remote network storage tier 100C. Other types of external sources might also be queried for other types of object location factors 204 in other embodiments.

From operation 306, the operation 300 proceeds back to operation 302, where the processes described above may be repeated. By repeating these operations, the storage manager 106 maintains an updated list of the available storage tiers 100, updated properties for each tier 100, and updated object location factors 204. As will be described in greater detail below with respect to FIG. 4, this information might be used to dynamically select an appropriate storage tier 100 at the time a request 201 to store an object 110 is received by the storage manager 106.

Figure 4:
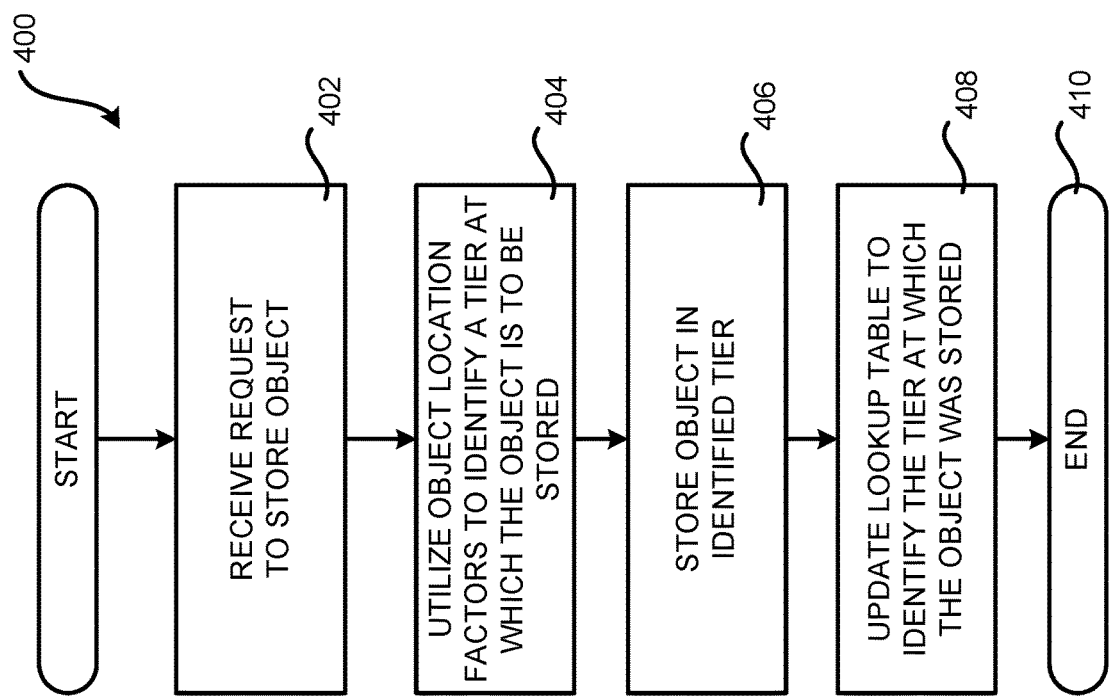
FIG. 4 is a flow diagram showing an illustrative routine that describes aspects the operation of a storage manager for storing an object at a dynamically selected storage tier, according to one embodiment disclosed herein.

FIG. 4 is a flow diagram showing an illustrative routine 400 that describes aspects of the operation of the storage manager 106 for storing an object 110 at a dynamically selected storage tier 100, according to one embodiment disclosed herein. The routine 400 begins at operation 402, where the storage manager 106 receives a request 201 to store an object 110. As discussed above, the request 201 may be unqualified and may not, therefore, specify a location for storage of the object 110. Additionally, the request 201 may optionally include an optimization factor 208 and one or more object location factors 204.

In response to receiving the request 201 at operation 402, the routine 400 proceeds to operation 404, where the storage manager 106 utilizes one or more of the available object location factors 204 and the optimization factor 208, if provided, to select one of the available storage tiers 100 for storage of the object 110. For instance, if an optimization factor 208 is provided with a request 201 to store an object 210 that specifies that storage of the object 110 is to be optimized based upon cost, the storage manager 106 might select the storage tier 100 having the lowest cost. In another example, if an optimization factor 208 is provided that specifies that storage of the object 110 is to be optimized based upon speed of access, the storage manager 106 might select a storage tier 100 accessible by way of a connection having the highest available bandwidth and/or the lowest latency. The storage manager 106 might also utilize a combination of object location factors 204 to select an appropriate tier 100 for storing an object 110. If an optimization factor 208 is not provided with a request 201 to store an object 110, the storage manager 106 might select a storage tier 100 based upon the available object location factors 204.

Once the storage manager 106 has selected an appropriate tier 100 for storage of the object 110, the routine 400 proceeds from operation 404 to operation 406. At operation 406, the storage manager 106 stores the object 110 in the selected storage tier 100. The routine 400 then proceeds to operation 408, where the storage manager 106 updates the lookup table 206 to identify the tier 100 at which the object 110 was stored. As will be described in greater detail below, the data stored in the lookup table 206 might be later utilized to retrieve the object 110 from the appropriate storage tier 100. From operation 408, the routine 400 proceeds to operation 410, where it ends.

Figure 5:
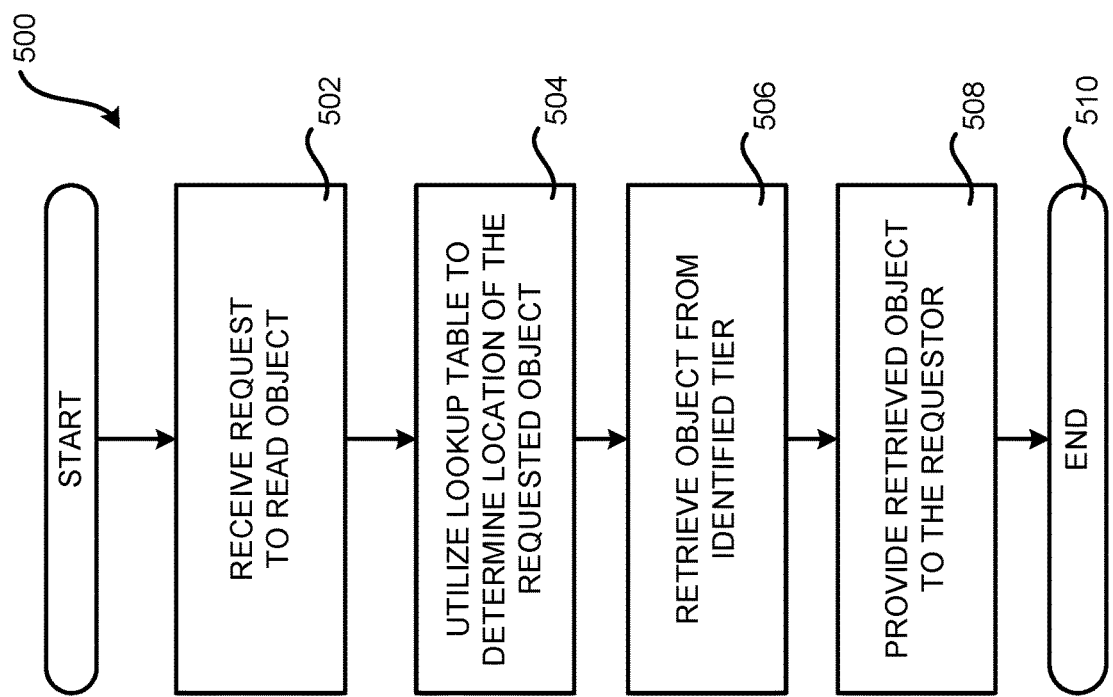
FIG. 5 is a flow diagram showing an illustrative routine that describes aspects the operation of a storage manager for retrieving an object previously stored at a dynamically selected storage tier, according to one embodiment disclosed herein.

FIG. 5 is a flow diagram showing an illustrative routine 500 that describes aspects the operation of the storage manager 106 for retrieving an object 110 previously stored at a dynamically selected storage tier 100, according to one embodiment disclosed herein. The routine 500 begins at operation 502, where the storage manager 106 receives a request to read an object 110 previously stored at one of the storage tiers 100.

In response to receiving the request for an object 110 at operation 502, the routine 500 proceeds to operation 504, where the storage manager 106 consults the lookup table 206 to determine the tier 100 at which the requested object 110 was previously stored. Once the tier 100 containing the requested object 110 has been identified, the routine 500 proceeds from operation 504 to operation 506.

At operation 506, the storage manager 106 retrieves the requested object 110 from the identified storage tier 100. The routine 500 then proceeds from operation 506 to operation 508, where the storage manager 106 provides the retrieved object 110 to the process that requested the object 110. The routine 500 then proceeds from operation 508 to operation 510, where it ends.

Figure 6:
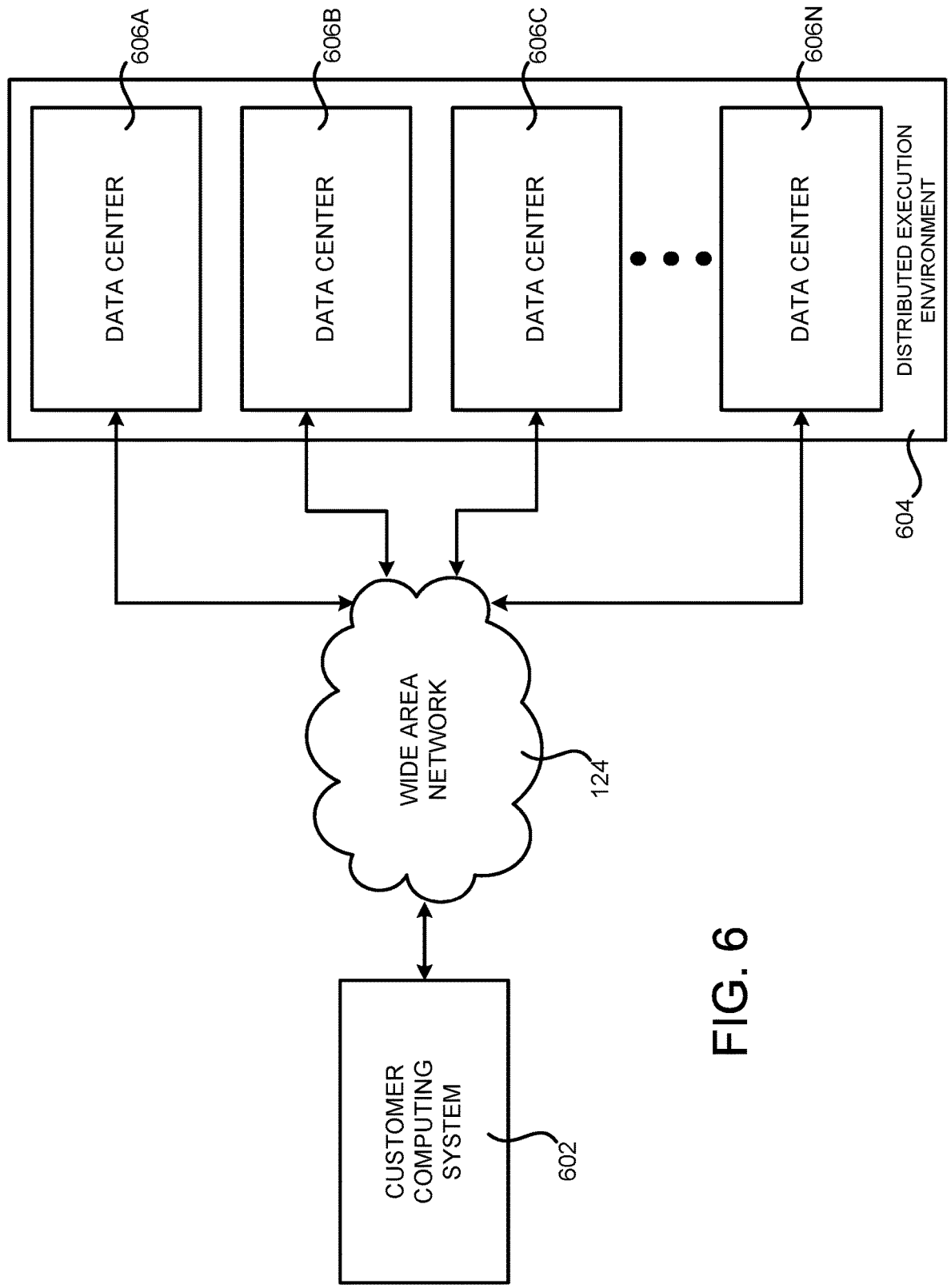
FIG. 6 is a system and network diagram that shows an illustrative operating environment that includes a distributed execution environment in which the various embodiments disclosed herein might be implemented.
Figure 7:
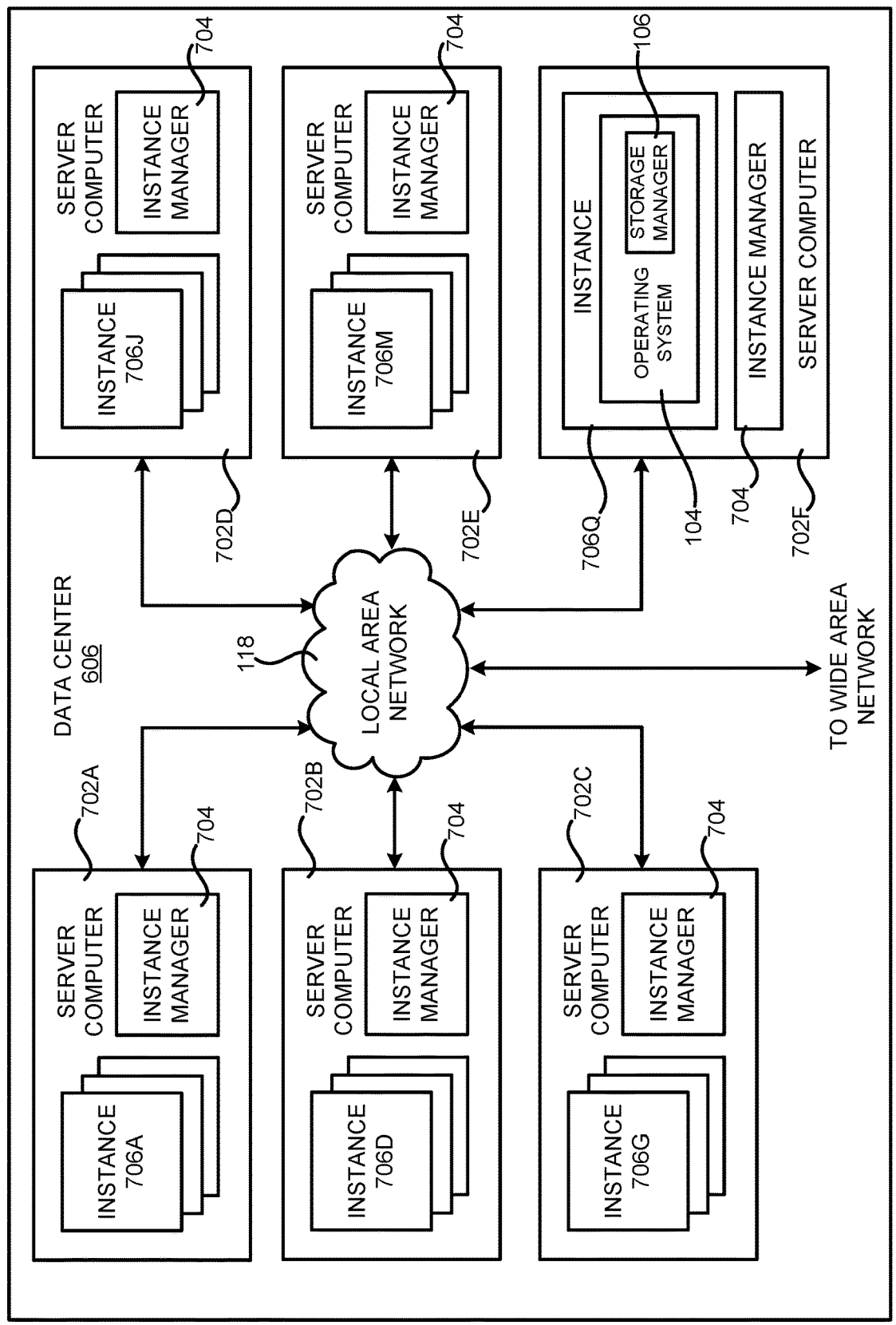
FIG. 7 is a computing system diagram that illustrates one configuration for a data center that implements aspects of the concepts and technologies disclosed herein for dynamic selection of a storage tier for storing data, according to one embodiment disclosed herein.

As discussed briefly above, the computing device 102 might be collocated with the computing systems that provide the remote network storage tier 100C in some embodiments. In these embodiments, the functionality disclosed herein for dynamically selecting a storage tier 100 might be implemented in a distributed execution environment 604 that can provide computing resources for executing an application 108 and an operating system 104 on a permanent or an as-needed basis. FIGS. 6 and 7 illustrate aspects of such a distributed computing environment 604.

The computing resources provided by the distributed execution environment 604 may include various types of resources, such as data processing resources, data storage resources, data communication resources, and the like. Each type of computing resource may be general-purpose or may be available in a number of specific configurations. For example, and as will be described in greater detail below, data processing resources may be available as virtual machine instances in a number of different configurations. The instances may be configured to execute applications, including Web servers, application servers, media servers, database servers, and other types of applications 108. Data storage resources may include file storage devices, block storage devices, and the like. These resources might be provided by the object storage service 126, the block storage service 128, and/or the long term storage service 130 described above with regard to FIG. 1.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Virtual machine instances might also be made available in a continuous ratio of processor to memory capabilities.

The computing resources provided by the distributed execution environment 604 are enabled in one implementation by one or more data centers 606A-606N (which may be referred herein singularly as "a data center 606" or in the plural as "the data centers 606"). The data centers 606 are facilities utilized to house and operate computer systems and associated components. The data centers 606 typically include redundant and backup power, communications, cooling, and security systems. The data centers 606 might also be located in geographically disparate locations. One illustrative configuration for a data center 606 that implements the concepts and technologies disclosed herein for dynamic selection of a storage tier 100 will be described below with regard to FIG. 7.

The customers and other consumers of the distributed execution environment 604 may access the computing resources provided by the data centers 606 over the WAN 124. Although a WAN 124 is illustrated in FIG. 6, it should be appreciated that a LAN 118, the Internet, or any other networking topology known in the art that connects the data centers 606 to remote customers and other users may be utilized. It should also be appreciated that combinations of such networks might also be utilized.

The customer computing system 602 is a computing device utilized by a customer or other consumer of the distributed execution environment 604. For instance, the customer computing system 602 may be a server computer, a desktop or laptop personal computer, a tablet computer, a wireless telephone, a PDA, an e-reader, a game console, a set-top box, or any other computing device capable of accessing the distributed execution environment 604. As will be described in greater detail below, the customer computing system 602 may be utilized to access a computing device 102, such as a server computer, located in one of the data centers 606 and executing an operating system 104 that provides the functionality disclosed herein for dynamically selecting a storage tier 100. The customer computing system 602 might utilize an application configured with RDP or another suitable protocol to view and interact with a desktop provided by the operating system 104 and an application 108. Additional details regarding this process are provided below.

FIG. 7 is a computing system diagram that illustrates one configuration for a data center 606 that implements a distributed execution environment 604, including the concepts and technologies disclosed herein for dynamic selection of a storage tier 100. The example data center 606 shown in FIG. 7 includes several server computers 702A-702F (which may be referred herein singularly as "a server computer 702" or in the plural as "the server computers 702") for providing computing resources for executing an operating system 104 and one or more applications 108. The server computers 702 may be standard tower or rack-mount server computers configured appropriately for providing the computing resources described above. For instance, in one implementation the server computers 702 are configured to provide instances 706A-706Q of computing resources.

In one embodiment, the instances 706A-706Q (which may be referred herein singularly as "an instance 706" or in the plural as "the instances 706") are virtual machine instances. As known in the art, a virtual machine instance is an instance of a software implementation of a machine (i.e. a computer) that executes programs like a physical machine. In the example of virtual machine instances, each of the servers 702 may be configured to execute an instance manager 704 capable of executing the instances. The instance manager 704 might be a hypervisor or another type of program configured to enable the execution of multiple instances 706 on a single server 702, for example.

As discussed above, each of the instances 706 may be configured to execute an operating system 104 configured with the functionality disclosed herein for dynamically selecting a storage tier 100 and one or more applications 108. For example, the server computer 702F shown in FIG. 7 is configured to execute the operating system 104 in an instance 706Q. The application 108 may also be executed in the instance 706Q.

As also discussed briefly above, a customer of the distributed execution environment 604 might connect to the operating system 104 utilizing a customer computing system 602 with an appropriately configured client application. For instance, the customer computing system 602 might utilize a RDP client application to connect to the instance 706Q and utilize the operating system 104 and the application 108.

When a customer computing system 602 is utilized to connect to and utilize the operating system 104 and the application 108 in the manner described above, the operating system 104 might utilize the functionality described above to dynamically select a storage tier 100 for storing customer data. For example, the storage manager 106 might select a device in the local storage tier 100A (i.e. the server computer 702F) for storing the customer data or might select a service in the remote network storage tier 100C for storing the customer data. It should be appreciated that in this example, one or more of the instances 706A-706Q might be utilized to provide the various storage services of the remote network storage tier 100C.

In the example data center 606 shown in FIG. 7, an appropriate LAN 118 is utilized to interconnect the server computers 702A-702F. The LAN 118 is also connected to the WAN 124 illustrated in FIGS. 1 and 6. It should be appreciated that the network topology illustrated in FIGS. 1, 6, and 7 has been greatly simplified and that many more networks and networking devices may be utilized to interconnect the various computing systems disclosed herein. Appropriate load balancing devices or software modules might also be utilized for balancing a load between each of the data centers 606A-606N, between each of the server computers 702A-702F in each data center 606, and between instances 706 purchased by each customer of the distributed execution environment 604. It should also be appreciated that the data center 606 described in FIG. 7 is merely illustrative and that other implementations might be utilized. Additionally, it should be appreciated that the functionality provided by the components described above might be implemented in software, hardware, or a combination of software and hardware. Other implementations should be apparent to those skilled in the art.

FIG. 8 shows an example computer architecture for a computer 800 capable of executing the program components described above for dynamically selecting a storage tier 100 for storing an object 110. The computer architecture shown in FIG. 8 illustrates a conventional server computer, workstation, desktop computer, laptop, tablet, smartphone, network appliance, personal digital assistant ("PDA"), e-reader, digital cellular phone, or other computing device, and may be utilized to execute the various software components presented herein. For example, the computer 800 shown in FIG. 8 might be utilized to execute the operating system 104 and/or the storage manager 106. The computer 800 might also be utilized to implement aspects of computing systems located at the local network storage tier 100B and/or the remote network storage tier 100C.

In the implementation shown in FIG. 8, the computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 may be standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 804 provides an interface between the CPUs 802 and the remainder of the components and devices on the baseboard. The chipset 804 may provide an interface to a RAM 806, used as the main memory in the computer 800. The chipset 804 may further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM may also store other software components necessary for the operation of the computer 800 in accordance with the embodiments described herein.

The computer 800 may operate in a networked environment using logical connections to remote computing devices and computer systems through a network, such as the local area network 118, described above. The chipset 804 may include functionality for providing network connectivity through a NIC 810, such as a gigabit Ethernet adapter. The NIC 810 is capable of connecting the computer 800 to other computing devices over the network 118. It should be appreciated that multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules, and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a Fibre Channel ("FC") interface, or other type of interface for physically connecting and transferring data between computers and physical storage units.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, and the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. As utilized herein, the term computer-readable storage media does not encompass transitory signals per se.

The mass storage device 812 may store an operating system 104 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. As illustrated in FIG. 8 and described above, the operating system 104 might also include a storage manager 106 configured to perform the functionality described above. As mentioned above, the functionality described herein as performed by the storage manager 106 might be performed by another component within the operating system 104, by a component other than the operating system 104, or by a combination of components.

The mass storage device 812 may store other system or application programs and data utilized by the computer 800, such as an application 108 and/or any of the other software components and data described above. The mass storage device 812 might also store other programs and data not specifically identified herein.

In one embodiment, the mass storage device 812 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions which, when executed by the computer 800, perform the routines 300, 400 and 500, described above with regard to FIGS. 3, 4, and 5, respectively.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for dynamic selection of storage tiers have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

The invention claimed is:

1. A computer-implemented method for dynamically selecting a storage tier for storing an object from a plurality of storage tiers, the method comprising performing computer-implemented operations for:
   receiving, via an Application Programming Interface (API) exposed by an operating system executing on a computing device, a request to store an object at an unspecified location, the request being received from an application executing on the computing device and the request comprising the object to be stored, one or more object location factors, and an optimization factor that identifies one or more attributes associated with selecting the storage tier for storing the object;
   monitoring a plurality of object location factors for the plurality of storage tiers, the plurality of storage tiers including a local storage tier including a memory of a local storage device and a mass storage device of the local storage device, a local network storage tier, and a remote network storage tier that comprises one or more storage resources provided by one or more data centers, wherein monitoring the plurality of object location factors includes monitoring a usage pattern associated with the object and the one or more object location factors; and
   in response to receiving the request, selecting by way of the operating system the selected storage tier from the plurality of storage tiers for storing the object based at least in part upon a type of the object, at least one of the plurality of the object location factors and the one or more object location factors, and the optimization factor;
   causing the object to be stored at the selected storage tier;
   creating data that indicates the object is stored at the selected storage tier;
   receiving a request to retrieve the object; and
   in response to receiving the request to retrieve the object, utilizing the data to identify the selected storage tier for the object, retrieving the object from the selected storage tier, and providing the object in response to the request to retrieve the object.

2. The computer-implemented method of claim 1, wherein the selection of the storage tier for storing the object is further based upon the optimization factor received via the API, and one or more security requirements.

3. The computer-implemented method of claim 1, further comprising:
   storing historical data that indicates historical usage patterns associated with the object and wherein the selecting by way of the operating system the selected storage tier from the plurality of storage tiers for storing the object is further based at least in part upon at least a portion of the historical data.

4. The computer-implemented method of claim 1, wherein the operating system executes on a virtual machine instance that executes in a distributed execution environment.

5. The computer-implemented method of claim 1, wherein the remote network storage tier comprises a storage service accessible to the computing device by way of a web service.

6. The computer-implemented method of claim 5, wherein one or more of the object location factors are retrieved from the storage service.

7. An apparatus, comprising:
a processor; and
a non-transitory computer-readable storage medium having computer-executable instructions stored thereupon which, when executed by the processor, cause the apparatus to:
receive, via an Application Programming Interface (API) exposed by an operating system executing on the apparatus, a request to store an object at an unspecified location, the request being received from an application executing on the apparatus and including the object to be stored, one or more object location factors, and an optimization factor that identifies one or more attributes associated with selecting the storage tier for storing the object;
in response to receiving the request, select, by the operating system, a selected storage location for storing the object based at least in part upon a type of the object, the one or more object location factors, and the optimization factor, wherein the selected storage location is selected from a plurality of storage locations including a local storage location and a network storage location, wherein the local storage location comprises one or more memories and one or more mass storage devices of the apparatus and the network storage location comprises one or more storage resources provided by one or more data centers;
cause the object to be stored at the selected storage location;
create data that indicates the object is stored at the selected storage location;
receive a request to retrieve the object; and
in response to receiving the request to retrieve the object, utilize the data to identify the selected storage location for the object, retrieve the object from the selected storage location, and provide the object in response to the request to retrieve the object.

8. The apparatus of claim 7, wherein selecting the storage location is based at least in part on historical data that indicates historical usage patterns associated with the object, and the one or more object location factors that include one or more of a sharing requirement or a security requirement for the object.

9. The apparatus of claim 8, wherein the network storage location comprises a storage service accessible to the apparatus by way of a web service.

10. The apparatus of claim 9, wherein at least one of the one or more object location factors are retrieved from the storage service.

11. The apparatus of claim 8, wherein the request further comprises at least one of the one or more object location factors.

12. The apparatus of claim 7, wherein at least one of the one or more object location factors are generated by monitoring communication with the local storage location and the network storage location.

13. The apparatus of claim 7, wherein the object location factors comprise one or more of an object type, object security requirements, object sharing requirements, or the compressibility of the object.

14. The apparatus of claim 7, wherein the network storage location comprises one or more storage systems accessible to the apparatus by way of a local area network (LAN).

15. A non-transitory computer-readable storage medium having computer-executable instructions stored thereupon which, when executed by a computer, cause the computer to:
receive, via an Application Programming Interface (API) exposed by an operating system executing on the computer, a request to store an object at an unspecified location, the request being received from an application executing on the computer and including the object to be stored, one or more object location factors, and an optimization factor that identifies one or more attributes associated with selecting the storage tier for storing the object;
in response to receiving the request to store the object, determine a selected storage tier for the object based at least in part upon a type of the object, and one or more object location factors, the selected storage tier is selected from a local storage tier that comprises one or more memories of the computer, one or more mass storage devices of the computer, and one or more of a local network storage tier, or a remote network storage tier;
cause the object to be stored at the selected storage tier;
create data that indicates the object is stored at the selected storage tier;
receive a request to retrieve the object; and
in response to receiving the request to retrieve the object, utilize the data to identify the selected storage tier for the object, retrieve the object from the selected storage tier, and provide the object in response to the request to retrieve the object.

16. The non-transitory computer-readable storage medium of claim 15, wherein the local network storage tier comprises one or more storage systems accessible to the computer by way of a local area network (LAN).

17. The non-transitory computer-readable storage medium of claim 15, wherein selecting the selected storage tier from the local storage tier, the local network storage tier, or the remote network storage tier is based at least in part upon historical data that indicates historical usage patterns associated with the object, and the one or more object location factors including one or more of a security requirement or a sharing requirement for the object.

18. The non-transitory computer-readable storage medium of claim 17, wherein the remote network storage tier comprises one or more storage services accessible to the computer.

19. The non-transitory computer-readable storage medium of claim 17, wherein one or more of the object location factors are retrieved from the storage services.

20. The non-transitory computer-readable storage medium of claim 17, wherein the one or more object location factors comprise one or more of security requirements of the object, sharing requirements of the object, or a compressibility of the object.

* * * * *